United States Patent
Blasco Serrano (10) Patent No.: US 10,863,466 B2
(45) Date of Patent: Dec. 8, 2020

(54) SYNCHRONIZATION SIGNAL SELECTION (71) Applicant: Telefonaktiebolaget LM Ericsson (publ), Stockholm (SE)

(72) Inventor: Ricardo Blasco Serrano, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/476,577

(22) PCT Filed: Feb. 7, 2018

(86) PCT No.: PCT/SE2018/050112
§ 371 (c)(1),
(2) Date: Jul. 9, 2019

(87) PCT Pub. No.: WO2018/151644
PCT Pub. Date: Aug. 23, 2018

(65) Prior Publication Data
US 2019/0357166 A1 Nov. 21, 2019

Related U.S. Application Data (60) Provisional application No. 62/459,042, filed on Feb. 14, 2017.

(51) Int. Cl.
H04W 56/00 (2009.01)
H04W 4/40 (2018.01)

(52) U.S. Cl.
CPC .......... H04W 56/0015 (2013.01); H04W 4/40 (2018.02)

(58) Field of Classification Search
CPC ................................................. H04W 56/0015
See application file for complete search history.

(56) References Cited

U.S. PATENT DOCUMENTS

2016/0374038 A1* 12/2016 Wang ................ H04W 56/0015

FOREIGN PATENT DOCUMENTS

EP 3001631 A1 3/2016

* cited by examiner

Primary Examiner — Ronald B Abelson
(74) Attorney, Agent, or Firm — Coats + Bennett, PLLC (57) ABSTRACT A wireless device (18) is configured for selecting a synchronization signal to use as a reference for device-to-device, D2D, communication. The wireless device (18) is configured to receive a multi-level synchronization signal (28) for which prioritization rules at the wireless device (18) define multiple priority levels. The wireless device (18) is also configured to select, from among multiple received synchronization signals including the multi-level synchronization signal (28), a synchronization signal to use as a reference for D2D communication, based on priority levels defined for the received synchronization signals and based on a radio resource (32) on which the wireless device (18) received the multi-level synchronization signal (28).

18 Claims, 6 Drawing Sheets

FIGURE 1

RECEIVE A MULTI-LEVEL SYNCHRONIZATION SIGNAL FOR WHICH PRIORITIZATION RULES AT THE WIRELESS DEVICE DEFINE MULTIPLE PRIORITY LEVELS
100

SELECT, FROM AMONG MULTIPLE RECEIVED SYNCHRONIZATION SIGNALS INCLUDING THE MULTI-LEVEL SYNCHRONIZATION SIGNAL, A SYNCHRONIZATION SIGNAL TO USE AS A REFERENCE FOR D2D COMMUNICATION, BASED ON PRIORITY LEVELS DEFINED FOR THE RECEIVED SYNCHRONIZATION SIGNALS AND BASED ON A RADIO RESOURCE ON WHICH THE WIRELESS DEVICE RECEIVED THE MULTI-LEVEL SYNCHRONIZATION SIGNAL
110

SYNCHRONIZATION SIGNAL SELECTION

RELATED APPLICATIONS

This application claims priority to U.S. Provisional Patent Application Ser. No. 62/459,042 filed Feb. 14, 2017, the entire contents of which are incorporated herein by reference.

TECHNICAL FIELD

The present application relates generally to device-to-device (D2D) communication, and relates more particularly to selecting a synchronization signal to use as a reference for such D2D communication.

BACKGROUND

Vehicle-to-everything (V2X) communication is a type of device-to-device communication (D2D) that involves a user equipment (UE) associated with a vehicle (which may also be referred to as a vehicular UE). In particular, V2X communication is any direct communication between a vehicular UE and either another vehicular UE, a non-vehicular UE associated for example with a pedestrian, or network infrastructure. V2X communication therefore includes vehicle-to-vehicle (V2V) communication, vehicle-to-pedestrian (V2P) communication, and/or vehicle-to-infrastructure (V2I) communication. V2X communication may for example convey safety-related information, such as information indicating a vehicle's presence or an event (e.g., a crash) detected by a vehicle.

In order to communicate, UEs synchronize with one other, e.g., in time and/or frequency, so as to share a common reference with one another. A UE may acquire synchronization through reception of a synchronization signal that the UE uses as a reference for D2D communication. Different synchronization signals may be prioritized differently, though, e.g., reflecting different levels of accuracy and/or different origins for those signals. In some contexts, this makes it challenging to select which synchronization signal to use as a reference for D2D communication.

SUMMARY

One or more embodiments herein exploit a radio resource on which a synchronization signal is received by a wireless device in order to determine whether to select that synchronization signal to use as a reference for device-to-device (D2D) communication. In some embodiments, this radio resource is exploited after synchronization signal prioritization, so as to resolve, account for, or otherwise address ambiguity regarding how to prioritize the received synchronization signal (e.g., due to prioritization being based on limited prioritization parameters).

More particularly, one or more embodiments herein include a method performed by a wireless device for selecting a synchronization signal to use as a reference for device-to-device (D2D) communication. The method may comprise receiving a multi-level synchronization signal for which prioritization rules at the wireless device define multiple priority levels. The method may also comprise selecting, from among multiple received synchronization signals including the multi-level synchronization signal, a synchronization signal to use as a reference for D2D communication, based on priority levels defined for the received synchronization signals and based on a radio resource on which the wireless device received the multi-level synchronization signal.

In some embodiments, selecting the synchronization signal to use comprises determining the priority levels defined for the received synchronization signals, and, after determining the multiple priority levels defined for the multi-level synchronization signal, determining whether to select the multi-level synchronization signal based on the radio resource on which the wireless device received the multi-level synchronization signal.

In some embodiments, the multiple received synchronization signals include a single-level synchronization signal for which the prioritization rules define a single priority level. In this case, selecting the synchronization signal to use may comprise, after determining the multiple priority levels defined for the multi-level synchronization signal and the single priority level defined for the single-level synchronization signal, selecting between the multi-level synchronization signal and the single-level synchronization signal based on radio resources on which the wireless device respectively received the multi-level and single-level synchronization signals.

In some embodiments, the prioritization rules define one or more priority levels for a synchronization signal based on values of multiple prioritization parameters associated with the synchronization signal. The prioritization parameters may include a radio resource on which the synchronization signal is received. In some of these embodiments, for example, the multiple received synchronization signals include a single-level synchronization signal for which the prioritization rules define a single priority level. In this case, prioritization parameters associated with the multi-level synchronization signal have certain values, and prioritization parameters associated with the single-level synchronization signal have the same certain values, except that the single-level synchronization signal and the multi-level synchronization signal are received on different radio resources.

In some embodiments, the multiple received synchronization signals include a single-level synchronization signal for which the prioritization rules define a single priority level. In this case, selecting a synchronization signal to use may comprise selecting the multi-level synchronization signal over the single-level synchronization signal based on the multi-level synchronization signal being received on a certain radio resource. In one embodiment, for example, the multi-level synchronization signal may be selected over the single-level synchronization signal based on the multi-level synchronization signal being received on a certain radio resource, irrespective of any signal measurements performed on the single-level synchronization signal and the multi-level synchronization signal.

In some embodiments, the method further comprises performing the D2D communication using the reference.

In some embodiments, the prioritization rules define different priority levels for synchronization signals with different origins.

In some embodiments, the multiple priority levels defined for the multi-level synchronization signal include a priority level for a synchronization signal originating from a wireless device indirectly synchronized to a global navigation satellite system and a priority level for a synchronization signal originating from a wireless device that is neither directly nor indirectly synchronized to a base station and that is neither directly or indirectly synchronized to a global navigation satellite system. In one embodiment, the multiple received synchronization signals include a single-level synchronization signal for which the prioritization rules define a single priority level. The single priority level may be a priority level for a synchronization signal originating from a wireless device that is neither directly nor indirectly synchronized to a base station and that is neither directly or indirectly synchronized to a global navigation satellite system.

In some embodiments, the prioritization rules define one or more priority levels for a synchronization signal based on values of multiple prioritization parameters associated with the synchronization signal. The prioritization parameters may include: a radio resource on which the synchronization signal is received; a sidelink synchronization signal identity with which the synchronization signal is generated; and one or more fields of a physical sidelink broadcast channel associated with the synchronization signal.

In some embodiments, the multi-level synchronization signal is received from another wireless device that is out of network coverage and that is using a further wireless device as a synchronization source. The further wireless device is also out of network coverage. In one such embodiment, the multiple priority levels are associated with ambiguity or uncertainty in whether the further wireless device is directly synchronized to a global navigation satellite system. Alternatively or additionally, the prioritization rules may define that the multi-level synchronization signal is to have one of the multiple priority levels when the further wireless device is directly synchronized to a global navigation satellite system and is to have a different one of the multiple priority levels when the further wireless device is not directly synchronized to a global navigation satellite system.

In some embodiments, the D2D communication is vehicle-to-everything, V2X, communication, and/or the wireless device is a user equipment associated with a vehicle.

Embodiments also include a corresponding apparatus, computer program, and carrier. For example, embodiments include a wireless device for selecting a synchronization signal to use as a reference for device-to-device, D2D, communication. The wireless device is configured to receive a multi-level synchronization signal for which prioritization rules at the wireless device define multiple priority levels. The wireless device is also configured to select, from among multiple received synchronization signals including the multi-level synchronization signal, a synchronization signal to use as a reference for D2D communication, based on priority levels defined for the received synchronization signals and based on a radio resource on which the wireless device received the multi-level synchronization signal.

DETAILED DESCRIPTION

Figure 1:
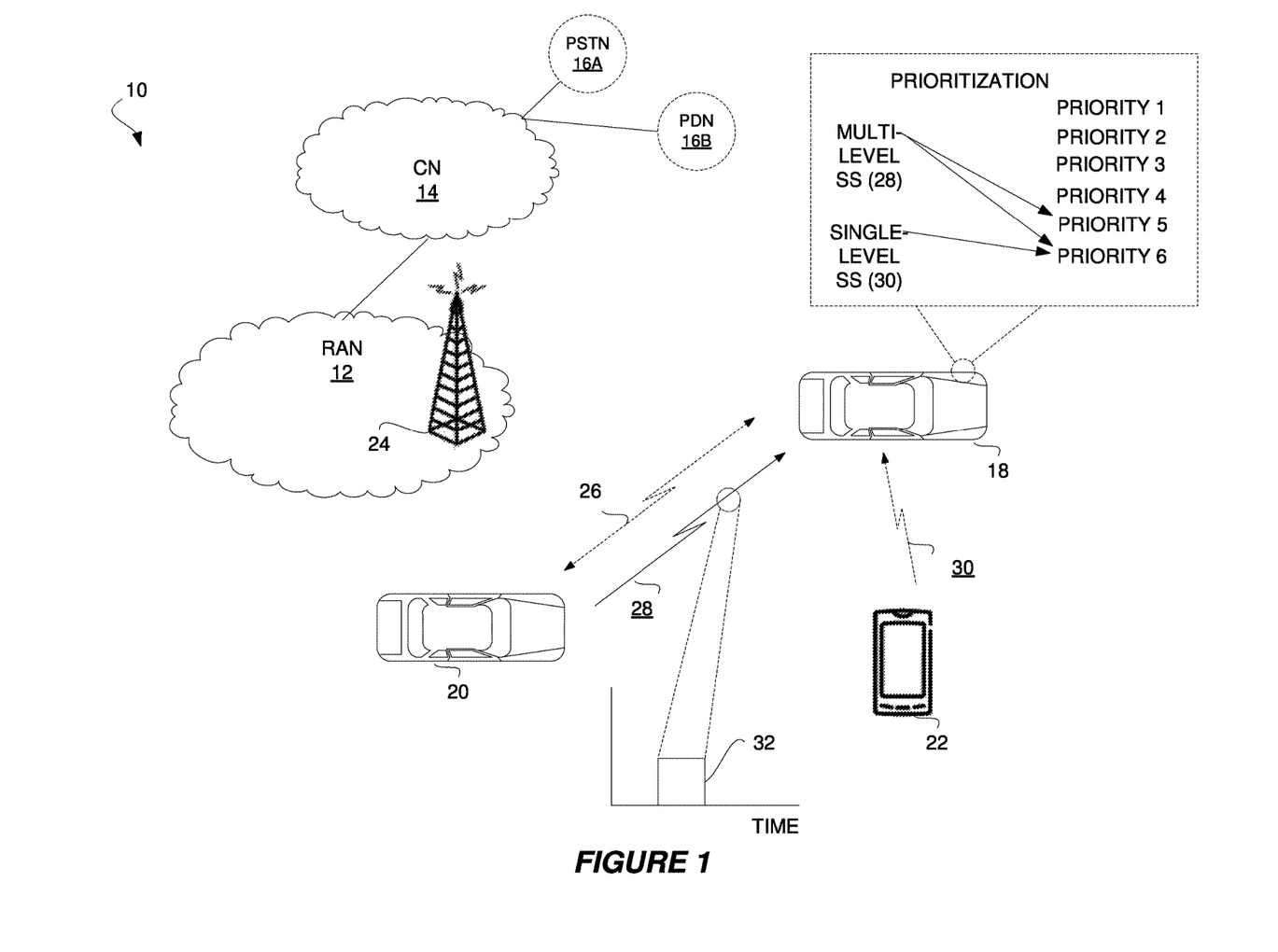
FIG. 1 is a block diagram of a wireless communication system according to some embodiments.

FIG. 1 illustrates a wireless communication system 10 according to some embodiments. As shown, the system 10 includes network infrastructure in the form of a radio access network (RAN) 12 and a core network (CN) 14 (e.g., operating according to Long Term Evolution, LTE, technology or 5G technology). The RAN 12 provides radio access to the CN 14, which may in turn provide connectivity to one or more external networks 16A, 16B. As shown, these external network(s) 16A, 16B include a public switched telephone network (PSTN) 16A and a packet data network (PDN) 16B, such as the Internet.

FIG. 1 also shows wireless devices 18, 20, and 22 in the system 10 according to some embodiments. Wireless devices 18 and 20 are associated with respective vehicles (e.g., a car, truck, bus, or the like) and may therefore be appropriately referred to as vehicular wireless devices 18, 20. Wireless devices 18 and/or 20 may for instance characterize the vehicles as a whole, may characterize components integrally installed or formed in the vehicles (e.g., in the vehicles' dashboard), and/or may characterize radio terminals communicatively connected to the vehicles (e.g., via Bluetooth). Wireless device 22 by contrast may not be so associated with a vehicle. Wireless device 22 may for instance be carried by a pedestrian. Other kinds of wireless devices may also exist in the system 10, such as for instance a wireless device associated with stationary traffic infrastructure (e.g., a traffic sign).

At least some of the wireless devices 18, 20, and 22 may support communication with the network infrastructure, e.g., on a downlink (DL) and/or an uplink (UL) channel. Such communication may involve for instance communication with radio network equipment 24 (shown in FIG. 1 as a base station or enhanced Node B, eNB) in the RAN 12, e.g., via LTE or 5G radio access. At least some of the wireless devices 18, 20, and 22 may additionally or alternatively support device-to-device communication, so as to support direct communication between the UEs, e.g., on a sidelink (SL) channel.

Wireless device 18 for example may be configured for device-to-device (D2D) communication, e.g., in the form of vehicle-to-everything (V2X) communication. Configured in this way, the wireless device 18 may be configured to directly communicate with wireless device 20 via vehicle-to-vehicle (V2V) communication, directly communicate with wireless device 22 via vehicle-to-pedestrian (V2P) communication, and/or communicate with radio network equipment 24 via vehicle-to-infrastructure (V2I) communication. FIG. 1 shows for example that the wireless device 18 may be configured to perform D2D communication 26 with wireless device 20, e.g., by transmitting to and/or receiving from the wireless device 20.

Wireless device 18 in this regard is configured to synchronize to a reference (e.g., in time and/or frequency) to perform the D2D communication. The wireless device 18 may synchronize to the same reference as that to which the wireless device 20 synchronizes, such that the wireless devices 18, 20 share a common reference for the D2D communication. The wireless device 18 may for instance receive one or more synchronization signals that are usable as such a reference. If the wireless device 18 receives multiple synchronization signals, the wireless device 18 is configured to select, from among those multiple received synchronization signals, a synchronization signal to use as the reference for the D2D communication 26.

The wireless device 18 in this regard may prioritize the synchronization signals and perform the selection based on that prioritization. For example, prioritization rules at the wireless device 18 may define priority levels for the synchronization signals, e.g., based on values of multiple prioritization parameters. The device 18 may perform the selection based on the priority levels defined for the received synchronization signals, e.g., by preferentially choosing the synchronization signal with the priority level deemed highest (although priority level may be just one of multiple selection criteria considered).

FIG. 1 shows that the wireless device 18 in some embodiments receives a so-called multi-level synchronization signal 28. A multi-level (ML) synchronization signal 28 is a synchronization signal for which prioritization rules at the wireless device 18 define multiple priority levels. That is, the multi-level synchronization signal 28 is prioritizable as having multiple priority levels. FIG. 1 illustrates for instance a multi-level synchronization signal 28 for which prioritization rules at the wireless device 18 define multiple priority levels 5 and 6. The multi-level synchronization signal 28 may be contrasted with a single-level synchronization signal 30, for which the prioritization rules at the wireless device 18 define a single priority level (e.g., only priority level 6 as shown in FIG. 1). Faced with a choice between the multi-level synchronization signal 28 and the single-level synchronization signal 30, the multi-level nature of the multi-level synchronization signal 28 may make it otherwise unclear as to which signal to select.

The multi-level nature of the synchronization signal's prioritization in some embodiments is attributable to a limited number of prioritization parameters or criteria used for the prioritization. Limiting the number of prioritization parameters or criteria in this way may advantageously reduce the complexity of the wireless devices needed for synchronization signal selection. But, in this and other cases, some ambiguity may exist as to which priority level a multi-level synchronization signal 28 is or should be assigned for synchronization signal selection.

Some embodiments herein notably exploit a radio resource 32 on which the multi-level synchronization signal 28 is received by the wireless device 18 in order to perform synchronization signal selection, e.g., while maintaining reduced complexity for synchronization signal selection. FIG. 1 shows this radio resource 32 as being a time resource (e.g., a subframe). In some embodiments, the wireless device 18 exploits the multi-level synchronization signal's reception on the radio resource 32, in order to determine how to prioritize and/or whether to select the multi-level synchronization signal 28. The radio resource 32 may thereby be exploited to resolve prioritization ambiguity or to perform synchronization signal selection appropriately despite unresolved prioritization ambiguity.

Figure 2:
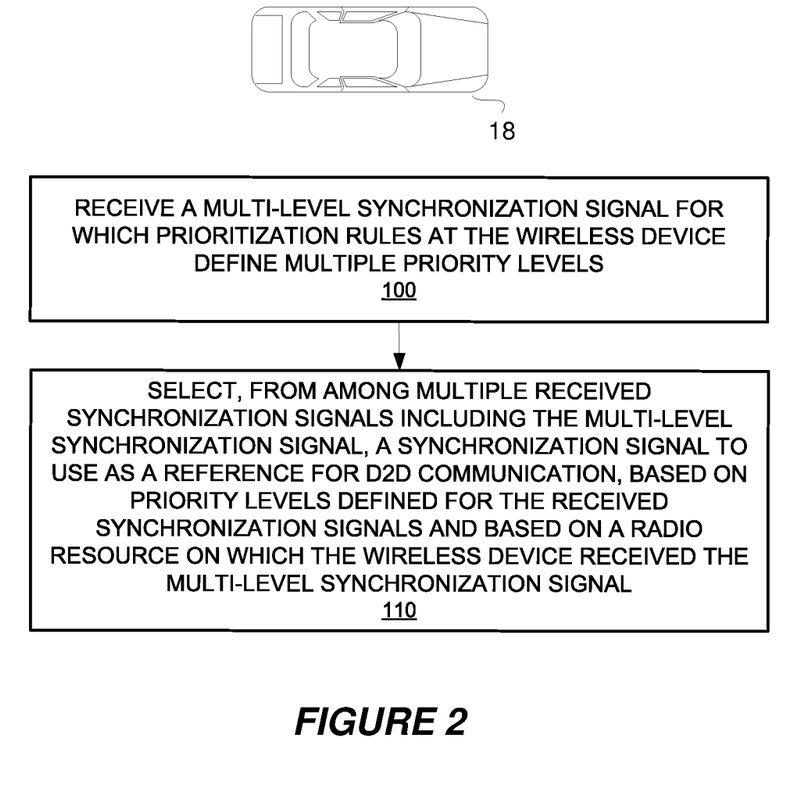
FIG. 2 is a logic flow diagram of a method performed by a wireless device according to some embodiments.

FIG. 2 for example illustrates processing performed by the wireless device 18 for selecting a synchronization signal to use as a reference for device-to-device (D2D) communication 26 according to some embodiments. As shown, the processing may include receiving a multi-level synchronization signal 28 for which prioritization rules at the wireless device 18 define multiple priority levels (Block 100). The processing may also include selecting, from among multiple received synchronization signals including the multi-level synchronization signal 28, a synchronization signal to use as a reference for D2D communication 26, based on priority levels defined for the received synchronization signals and based on a radio resource 32 on which the wireless device 18 received the multi-level synchronization signal 28 (Block 110).

In some embodiments, for example, after the wireless device 18 determines the multiple priority levels defined for the multi-level synchronization signal 28, the device 18 may determine whether to select the multi-level synchronization signal 28 based on the radio resource 32 on which the device 18 received the multi-level synchronization signal 28. Alternatively or additionally, after determining the multiple priority levels defined for the multi-level synchronization signal 28 and the single priority level defined for the single-level synchronization signal 30, the device 18 may select between the multi-level synchronization signal 28 and the single-level synchronization signal 30 based on radio resources on which the wireless device 18 respectively received the multi-level and single-level synchronization signals.

For example, the wireless device 18 may determine that one received synchronization signal is prioritizable as having priority level 5 but is also prioritizable as having priority level 6, such that the received signal is a multi-level synchronization signal 28. The wireless device 18 may also determine that another received synchronization signal is only prioritizable as having priority level 6, so as to be a single-level synchronization signal 30. Because the multi-level synchronization signal 28 is prioritizable as having either the same or a higher priority level as the single-level synchronization signal 30, prioritization of the synchronization signals 28, 30 may be insufficient for the wireless device 18 to select between them. Therefore, after determining the priority levels at which the synchronization signals 28, 30 are prioritizable, the wireless device 18 may select (exclusively) between those signals 28, 30 based on the radio resources on which the signals 28, 30 were received. In some embodiments, for instance, the wireless device 18 may select the multi-level synchronization signal 28 over the single-level synchronization signal 30 based on the multi-level synchronization signal 28 being received on a certain radio resource (that may differ from the radio resource on which the single-level synchronization signal 30 was received).

In fact, in one embodiment, the wireless device 18 may do so even if signal measurements performed on the synchronization signals 28, 30 suggests that the single-level synchronization signal 30 has better signal strength and/or quality. The wireless device 18 may be configured in this way based on an assumption that, although better signal strength and/or quality may justify selecting one synchronization signal over another synchronization signal if those signals have the same priority levels, better signal strength and/or quality may not justify selecting a synchronization signal that has a lower priority level than another synchronization signal. And since in some embodiments the possible priority levels of the multi-level synchronization signal 28 are higher than or equal to, but not less than, the priority level of the single-level synchronization signal 30, the multi-level synchronization signal 28 is (always) selected over the single-level synchronization signal 30, irrespective of signal measurements performed on those signals 28, 30.

Accordingly, in these and other embodiments, the radio resource 32 on which the device 18 received the multi-level synchronization signal 28 may serve as selection criteria separate and apart from the priority levels used for the selection. This may be the case even if the radio resource 32 also serves as a prioritization parameter based on which the synchronization signals are prioritizable. In fact, in some embodiments, the wireless device 18 operates in this way to effectively ensure that the selection is performed in accordance with the prioritization intended by the rules, even when those rules create ambiguity as to the appropriate priority level to assign to the multi-level synchronization signal 28 for the selection process. That is, the wireless device 18 in some embodiments may exploit the radio resource 32 on which a multi-level synchronization signal 28 is received in order to perform synchronization signal selection appropriately despite not actually resolving, or being able to resolve, ambiguity in how the multi-level synchronization signal 28 is to be prioritized.

In some embodiments, the prioritization rules define one or more priority levels for a synchronization signal based on values of multiple prioritization parameters associated with the synchronization signal. The prioritization parameters may include for instance a sidelink synchronization signal identity (SLSSID) with which the synchronization signal is generated and/or one or more fields of a physical sidelink broadcast channel (PSBCH) associated with the synchronization signal. The prioritization parameters may alternatively or additionally include a radio resource on which the synchronization signal is received. In such a case, the wireless device 18 in some embodiments may receive synchronization signals (e.g., the multi-level synchronization signal 28 and the single-level synchronization signal 30) that each have the same values for multiple prioritization parameters (e.g., SLSSID and PSBCH field(s)), except the synchronization signals have different values for a prioritization parameter comprising a radio resource on which a synchronization signal is received. The device may then select from among the received synchronization signals, the synchronization signal received on a certain radio resource (e.g., a radio resource with an index of 2), and then use the selected synchronization signal as a reference for D2D communication.

Figure 3:
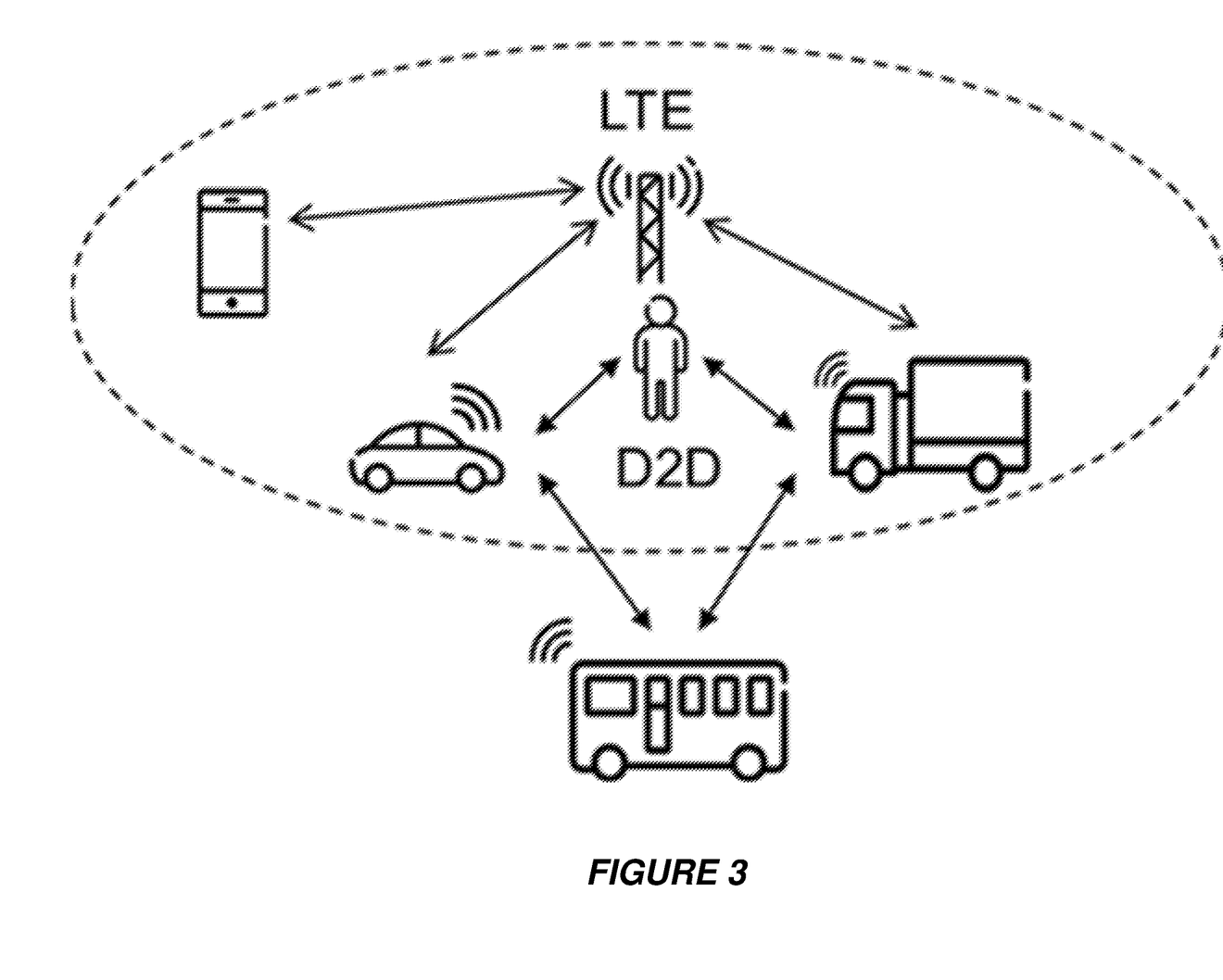
FIG. 3 is a block diagram of a wireless communication system for D2D communication according to some embodiments.
Figure 4:
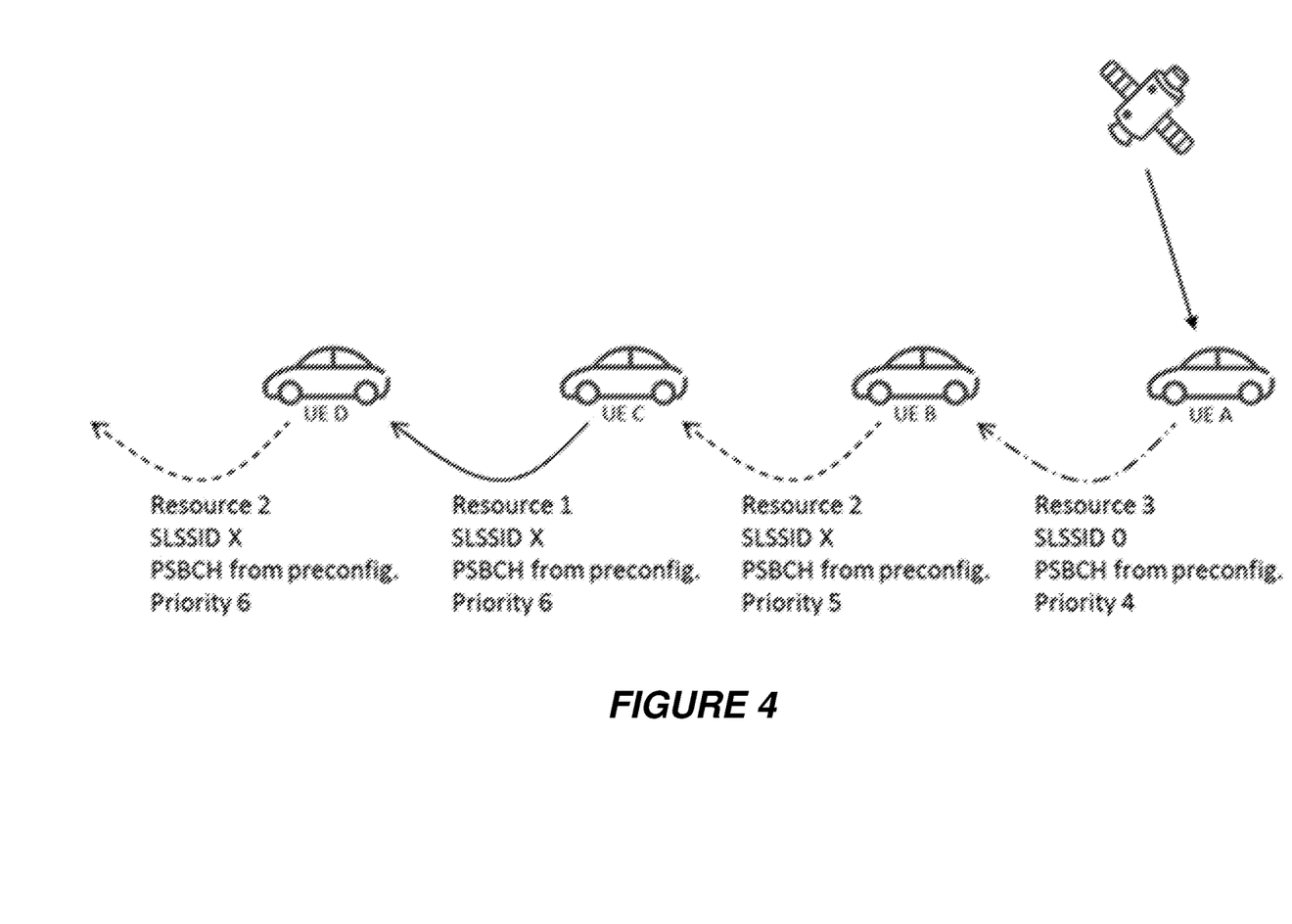
FIG. 4 is a block diagram of synchronization signal transmission according to some embodiments.
Figure 5:
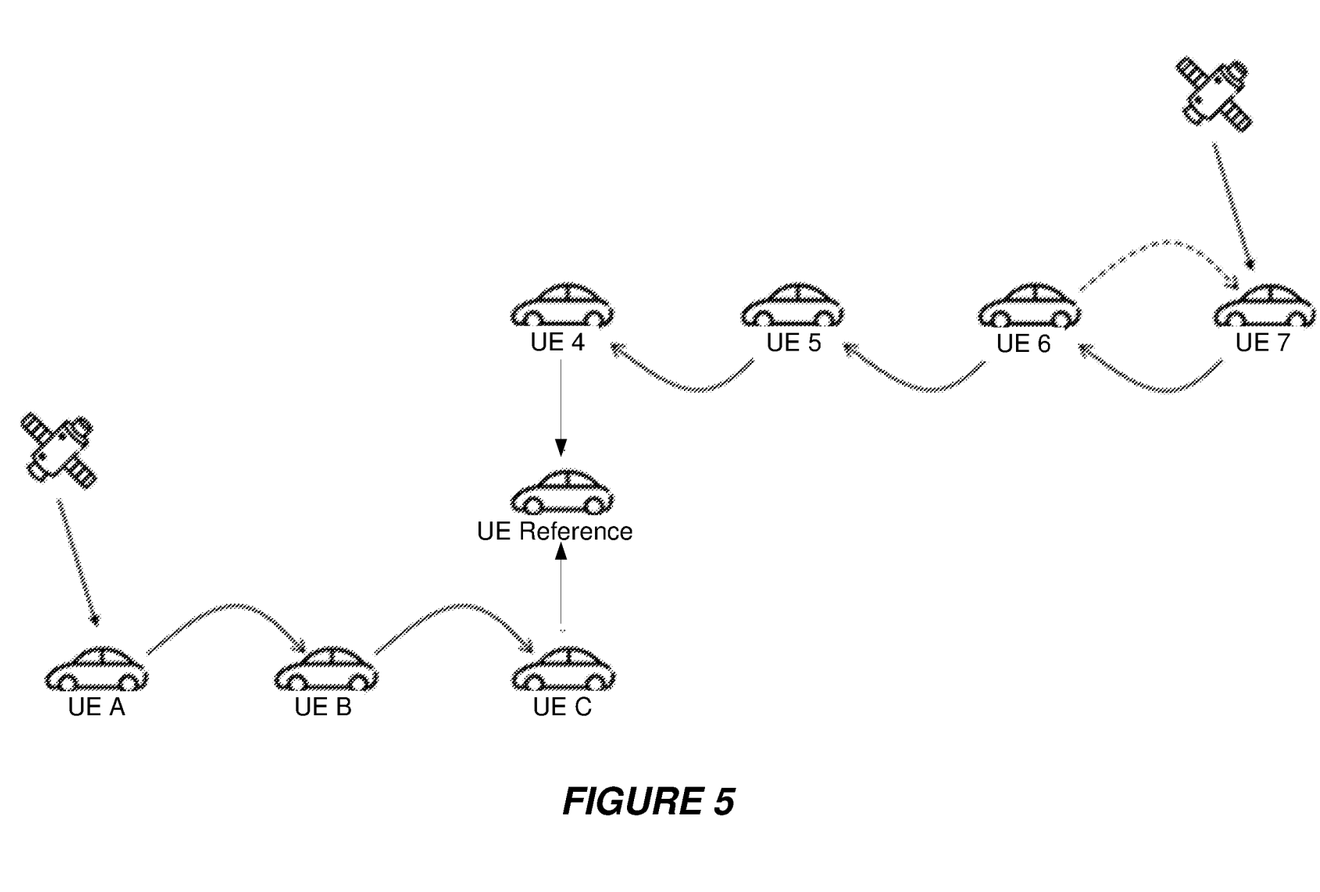
FIG. 5 is a block diagram of synchronization signal transmission according to other embodiments.

FIGS. 3-5 illustrate one example of some of the above embodiments, with occasional reference to V2X communication in particular. In this regard, during Release 12, the LTE standard has been extended with support of device to device (D2D) (specified as "sidelink") features targeting both commercial and Public Safety applications. Some applications enabled by Rel-12 LTE are device discovery, where devices are able to sense the proximity of another device and associated application by broadcasting and detecting discovery messages that carry device and application identities. Another application consists of direct communication based on physical channels terminated directly between devices.

One of the potential extensions for the D2D work consists of support of V2x communication, which as shown in FIG. 3 includes any combination of direct communication between vehicles, pedestrians and infrastructure. V2x communication may take advantage of a network (NW) infrastructure, when available, but at least basic V2x connectivity should be possible even in case of lack of coverage. Providing an LTE-based V2x interface may be economically advantageous because of the LTE economies of scale and it may enable tighter integration between communications with the NW infrastructure (V2I) and V2P and V2V communications, as compared to using a dedicated V2x technology.

V2x communications may carry both non-safety and safety information, where each of the applications and services may be associated with specific requirements sets, e.g., in terms of latency, reliability, capacity, etc. More particularly in this regard, the European Telecommunications Standards Institute (ETSI) has defined two types of messages for road safety: Co-operative Awareness Message (CAM) and Decentralized Environmental Notification Message (DENM).

The CAM message is intended to enable vehicles, including emergency vehicles, to notify their presence and other relevant parameters in a broadcast fashion. Such messages target other vehicles, pedestrians, and infrastructure, and are handled by their applications. CAM message also serves as active assistance to safety driving for normal traffic. The availability of a CAM message is indicatively checked for every 100 ms, yielding a maximum detection latency requirement of <=100 ms for most messages. However, the latency requirement for Pre-crash sensing warning is 50 ms.

The DENM message is event-triggered, such as by braking, and the availability of a DENM message is also checked for every 100 ms, and the requirement of maximum latency is <=100 ms.

The package size of CAM and DENM message varies from 100+ to 800+ bytes and the typical size is around 300 bytes. The message is supposed to be detected by all vehicles in proximity.

The SAE (Society of the Automotive Engineers) also defined the Basic Safety Message (BSM) for dedicated short range communications (DSRC) with various messages sizes defined. According to the importance and urgency of the messages, the BSMs are further classified into different priorities.

In order to establish communication, user equipments (UEs) such as V2x UEs need to be synchronized in time and in frequency. That is, they must share a common reference for time and frequency. In LTE V2X, UEs may acquire this common reference in several ways (i.e., from different sources). They may derive it from a global navigate satellite system (GNSS) signal (e.g., through obtaining a coordinated universal time (UTC) value and using it to derive a common time and/or frequency reference). They may derive it from a NW signal (e.g., from a downlink signal). They may derive it from signals transmitted by other UEs (e.g., using a distributed synchronization protocol such as the sidelink synchronization signals (SLSS) protocol.

In general, each of these sources has a different level of accuracy. Thus, it may be preferable to use those synchronization sources with higher accuracy, whenever possible. That is, it may be desirable to establish a hierarchy among the synchronization sources, e.g., defining a prioritization of the synchronization sources for use in synchronization source selection. Other reasons than accuracy may motivate this too (e.g., control of an operator, etc.).

Note that the hierarchy may apply between GNSS, NW, and UE signals but also between UE signals with different origins. For example, the LTE V2X specification includes the following hierarchy (for the case in which the UE detects no eNB in a carrier which is (pre)configured as the carrier which potentially includes eNBs used as sync reference, when the (pre)configuration information indicates that eNB timing has higher priority than GNSS). At the top of the hierarchy with Priority level 1 are synchronization signals originating from a UE directly synchronized to eNB. Going down in the hierarchy with Priority level 2 are synchronization signals originating from a UE indirectly synchronized to eNB (i.e., a UE whose synchronization reference is another UE that is directly synchronized to eNB). Further down in the hierarchy with Priority level 3 are synchronization signals originating from GNSS. Still further down in the hierarchy with Priority level 4 are synchronization signals originating from a UE directly synchronized to GNSS. Yet further down in the hierarchy with Priority level 5 are synchronization signals originating from a UE indirectly synchronized to GNSS (i.e., a UE whose synchronization reference is another UE that is directly synchronized to GNSS). At the bottom of the hierarchy with Priority level 6 are synchronization signals originating from other UEs.

Here Priority 1 corresponds to highest priority and Priority 6 corresponds to lowest priority. That is, a UE is to use a synchronization signal with Priority level 1 before using a synchronization signal with any other priority, including Priority level 6. In general, higher priority levels correspond to "better" synchronization sources. Here "better" may mean more accurate, better compatibility with the main synchronization reference (i.e., the one most UEs may use), etc.

To enable this hierarchy, it is necessary to be able to distinguish the different synchronization signals. That is, the synchronization signals associated with different priorities must have some feature that allows for distinguishability.

In the LTE V2X specification, synchronization signals transmitted from UEs (i.e., SLSS synchronization signals) have several distinguishing factors in this regard. One factor includes the SLSS identity (SLSSID), which is an integer value, used for generating the signals. Another factor includes part of the contents of the Physical Sidelink Broadcast Channel (PSBCH) that the signals carry. This includes an in-coverage flag (i.e., single bit). Note that the PSBCH contains a Direct Frame Number field that cannot be used for distinguishing signals transmitted at the same time since such signals usually have the same DFN value. Another factor includes the time-frequency resource in which the signals are transmitted. Note though that the higher the number of distinguishable synchronization signals, the more complex the receiver becomes (because it may need to test more cases to completely distinguish the signals).

In the LTE V2X specification, SLSSID, PSBCH contents, and the resource used for transmission of synchronization signals by UEs are selected according to the below rules, so that receivers will be able to distinguish the priority levels of the signals. According to rule 1, if a UE is in coverage, using the NW as a synchronization source, the UE is to transmit a synchronization signal with Resource 1, SLSSID configured by the NW, and PSBCH from the network (with coverage flag=1). According to rule 2, if the UE is in coverage, using GNSS as synchronization source, the UE is to transmit a synchronization signal with Resource 1, PSBCH from the network (with coverage flag=0), and SLSSID=0. According to rule 3, if the UE is in partial coverage (that is, the UE is out of coverage from the NW but synchronized to a UE that is in coverage), the UE is to transmit a synchronization signal with Resource 2, PSBCH from synchronization source (with coverage flag=0), and SLSSID from Sync Ref (from synchronization source). According to rule 4, if the UE is out of coverage using a UE in partial coverage as synchronization source, the UE is to transmit a synchronization signal with Resource 1, PSBCH from synchronization source (with coverage flag=0), and SLSSID from synchronization source+168. If the UE is out of coverage using a UE out of coverage as synchronization source, there are two cases to distinguish. According to rule 5A, if the synchronization source is directly synchronized to GNSS (i.e., transmitting on resource 3), the UE is to transmit a synchronization signal with Resource 2, PSBCH from synchronization source (with coverage flag=0), and SLSSID=X (where X is an SLSSID value to be defined, e.g., integer value such as X=168 or 169). In other cases, though, according to rule 5B the UE is to transmit a synchronization signal with Resource 1 or 2 (different from the one used by the synchronization source), PSBCH from synchronization source (with coverage flag=0), and SLSSID from synchronization source. According to rule 6, if the UE is isolated and does not have GNSS as its synchronization source, the UE is to transmit a synchronization signal with Resource 1 or 2 chosen randomly, PSBCH from preconfiguration (with coverage flag=0), and SLSSID=Y (where Y is a value to be specified). According to rule 7, if the UE is isolated and does and uses GNSS as its synchronization source, the UE is to transmit a synchronization signal with Resource 3, PSBCH from preconfiguration (with coverage flag=0), and SLSSID=0.

Resource 1, 2, and 3 may be three different subframes. During that subframe, the synchronization signals may be transmitted on a specific set of the resource blocks. In some embodiments, there may be no other V2X transmissions than synchronization transmissions during those subframes.

Transmitting synchronization signals according to the above rules does not allow for distinguishing some signals with different priority levels. Consider FIG. 4, which illustrates the problem using sidelink synchronization signals (SLSS).

As shown, UE A receives a synchronization signal originating from GNSS in order to directly synchronize to GNSS. According to the prioritization hierarchy, UE A is to give the signal from the GNSS priority level 3. UE A also transmits a synchronization signal. UE A does so according to rule 7 above (i.e., with Resource 3, SLSSID=0, and PSBCH from pre-configuration) because UE A is isolated and uses GNSS as its synchronization source. Transmitting the synchronization signal according to rule 7 effectively indicates to any recipient of the signal that UE A is directly synchronized to GNSS. UE B in this regard receives the synchronization signal from UE A and detects that the signal was transmitted according to rule 7. Detecting that the signal was transmitted according to rule 7, UE B determines that the signal is to be given priority level 4 according to the prioritization hierarchy.

UE B in turn transmits its own synchronization signal. UE B does so according to rule 5A (i.e., with Resource 2, SLSSID=X, and PSBCH from pre-configuration) because UE B is out of coverage and UE B's synchronization source (namely, UE A) is out of coverage but directly synchronized to GNSS. UE C receives this synchronization signal. UE C should in fact give the synchronization signal from UE B priority level 5 in this example, because the signal originates from a UE that is indirectly synchronized to GNSS.

UE C also transmits its own synchronization signal. UE C does so according to rule 5B (i.e., with Resource 1, SLSSID=X, and PSBCH from pre-configuration) because UE C is out of coverage and UE C's synchronization source (namely, UE B) is out of coverage and not directly synchronized to GNSS. UE D receives this synchronization signal. UE D should give the synchronization signal from UE C priority level 6, because the signal originates from a UE that is neither directly nor indirectly synchronized to GNSS.

UE D further transmits its own synchronization signal. UE D also does so according to rule 5B (i.e., with Resource 2, SLSSID=X, and PSBCH from pre-configuration) because UE D is out of coverage and UE D's synchronization source (namely, UE C) is out of coverage and not directly synchronized to GNSS. A recipient of this signal should give the signal priority level 6 because the signal originates from a UE that is neither directly nor indirectly synchronized to GNSS.

Notably, though, when UE D transmits its synchronization signal according to rule 5B, the synchronization signal is transmitted with the same parameter values as the synchronization signal transmitted by UE B according to rule 5A. That is, despite transmitting the signals according to different rules, both UE B and UE D transmit their synchronization signals with Resource 2, SLSSID=X, and PSBCH from pre-configuration, making them indistinguishable from one another. The signals are transmitted in this way even though the signal from UE B should be given priority level 5 whereas the signal from UE D should be given priority level 6.

The effect of this is that a synchronization signal with Resource 2, SLSSID=X, and PSBCH from pre-configuration is prioritizable as having multiple different priority levels (i.e., is a multi-level synchronization signal as used herein). And, in this example, a recipient of such a signal (e.g., UE C) cannot unambiguously determine which priority level the signal should be given.

In order to be able to distinguish the signals that are heretofore indistinguishable, it would otherwise be necessary to introduce some distinguishing feature. This is undesirable since it increases the receiver complexity. An alternative is to not distinguish the signals at all. This is also undesirable since it degrades the performance of synchronization and ultimately of communication.

One or more embodiments herein perform synchronization signal selection in a way that respects the desired prioritization rules, even without being able to unambiguously determine which priority level a multi-level synchronization signal is to be given. Consider the example in FIG. 5.

As shown, UE reference receives two synchronization signals: one from UE 4 and one from UE C. Based on these two signals it has to select one of the two UEs as synchronization source. Similar to UE C in FIG. 4, the synchronization signal from UE C in FIG. 5 is transmitted according to rule 5B with Resource 1, PSBCH from pre-configuration, and SLSSID=X. The signal from UE C is a single-level synchronization signal because it is unambiguously to be given priority level 6, i.e., there is no other priority level defined as possible for a signal transmitted with Resource 1, PSBCH from pre-configuration, and SLSSID=X. By contrast, similar to UE D in FIG. 4, the synchronization signal from UE 4 is transmitted according to rule 5B with Resource 2, PSBCH from pre-configuration, and SLSSID=X. The signal from UE 4 is therefore a multi-level synchronization signal since a signal with Resource 2, PSBCH from pre-configuration, and SLSSID=X is prioritizable with a priority level of either 5 or 6. Indeed, the synchronization signal is not distinguishable from a signal transmitted by UE B or UE 6 which should have a priority level of 5 instead of the priority level 6 that should be given to the signal transmitted by UE 4.

UE reference has no way of telling whether the signal from UE 4 has priority 5 (which is higher than the priority level 6 signal from UE C) or priority 6 (which is the same as the priority level 6 signal from UE C). Nonetheless, according to some embodiments, UE reference (e.g., when selecting between UE 4 and UE C) always selects as synchronization source the UE transmitting the synchronization signal in Resource 2, with PSBCH from preconfiguration, and SLSSID=X. In some embodiments, when UE reference selects the signal in resource 2 as synchronization source, it is ensuring that it is always choosing the source with highest priority. If instead it selects the signal in resource 1 as synchronization source, then it may happen that this signal has lower priority (level 6) when compared to the signal in resource 2 (which could be level 5).

Accordingly, in some embodiments, when selecting between a synchronization signal with (SSLID=X; PSBCH from preconfig; Resource2) which ambiguously has either a priority level of 5 or 6, and a synchronization signal with (SSLID=X; PSBCH from preconfig; Resource1) which has a definite priority level of 6, the wireless device 18 actually inspects the resource parameter and chooses the signal with Resource2. Here, the selection process may occur as between two certain synchronization signals (e.g., the wireless device 18 may just have these two signals to choose from). In some embodiments, this may amount to effectively resolving the ambiguity between priority level 5 and 6 in favor of the highest priority level. But this resolution may not be reflected knowingly in the actual device logic (e,g, the device 18 may not really know it's resolving the ambiguity in this way—the device 18 just chooses the synchronization signal received on resource 2).

In some embodiments, the UE disregards some measurements in taking the decision. As an illustration, consider again the example in FIG. 5 and assume that the signal transmitted by UE C is stronger than the signal transmitted by UE 4. Even if UE C appears to be a better candidate as synchronization source (in terms of signal strength), UE reference selects UE 4. More particularly, a UE searching for a sync reference that receives an SLSS on Resource 1 (SLSSID=X, InC=0, PSBCH from preconf) and SLSS on Resource 2 (SLSSID=X, InC=0, PSBCH from preconfig) always follows the second signal. It is not necessary to change any parameter (SLSSID, InC bit, etc.) for Sync priority.

One or more embodiments herein thereby include a UE implementation that treats some synchronization signals with a fixed priority even when their priority cannot be assessed. The implementation in some embodiments is carried in the following steps. First, the UE receives one or more synchronization signals. Second, the UE identifies the priority or priorities that are compatible with each of the received signals. Note that since synchronization signals may not be fully distinguishable, some of the received signals may be compatible with more than one priority level. Third, the UE chooses one signal to use as synchronization signal. Note that the choice respects the specified list of priorities, even though the priorities of some of the signals may not have been unambiguously determined. The chosen synchronization signal may be used as a reference for performing transmission and/or reception of V2X communications.

Note that some embodiments are relevant whenever some of the synchronization signals are compatible with more than one priority level. That is, they may correspond to synchronization signals transmitted by synchronization sources with different priority levels.

Note also that some embodiments do not necessarily allow for choosing a correct synchronization signal under arbitrary ambiguity. Some embodiments may only prove useful for some specific types of ambiguity, e.g., such as that illustrated in the example above. One or more embodiments herein have an advantage of performing synchronization signal selection without additional features that allow for synchronization signal distinguishability and that make the receiver more complex.

As used herein, "wireless device" refers to a device capable, configured, arranged and/or operable to communicate wirelessly with network equipment and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE). As one specific example, a wireless device 18 may represent a UE configured for communication in accordance with one or more communication standards, e.g., promulgated by the $3^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user. Although various embodiments herein are described with respect to a user equipment, those embodiments are extendable to a wireless device.

The wireless device may support device-to-device (D2D) communication, for example by implementing a 3GPP standard for sidelink communication, and may in this case be referred to as a D2D communication device.

As yet another specific example, in an Internet of Things (IOT) scenario, a wireless device may represent a machine or other device that performs monitoring and/or measurements, and transmits the results of such monitoring and/or measurements to another wireless device and/or a network equipment. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In another scenario, a wireless communication device or user equipment as described herein may be comprised in or otherwise associated with a vehicle and may perform monitoring and/or reporting of the vehicle's operational status or other functions associated with the vehicle.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As used herein, "radio network equipment" refers to equipment capable, configured, arranged and/or operable to communicate directly or indirectly with a wireless device and/or with other equipment in the wireless communication network that enable and/or provide wireless access to the wireless device. Examples of radio network equipment include, but are not limited to, access points (APs), in particular radio access points or nodes. Radio network equipment may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Radio Network equipment" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of radio network equipment include multi-standard radio (MSR) radio equipment such as MSR BSs, network controllers such as radio network controllers (RNCs) or base station controllers (BSCs), base transceiver stations (BTSs), transmission points, and transmission nodes.

As used herein, the term "radio node" is used generically to refer both to wireless devices and network equipment, as each is respectively described above.

One or more embodiments herein may be expressed in terms of LTE V2X, but they may apply to other cases and other technologies than LTE. Indeed, the wireless communication system described herein may represent any type of communication, telecommunication, data, cellular, and/or radio network or other type of system. In particular embodiments, the wireless communication system may be configured to operate according to specific standards or other types of predefined rules or procedures. Thus, particular embodiments of the wireless communication system may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

The wireless device 18 may perform the processing herein by implementing any functional means or units. In one embodiment, for example, the wireless device 18 comprises respective circuits configured to perform the steps shown in FIG. 2, and/or the steps in any of the enumerated embodiments below. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the wireless device 18 contains instructions executable by the processing circuitry whereby the wireless device 18 is configured to carry out the processing herein.

Figure 6:
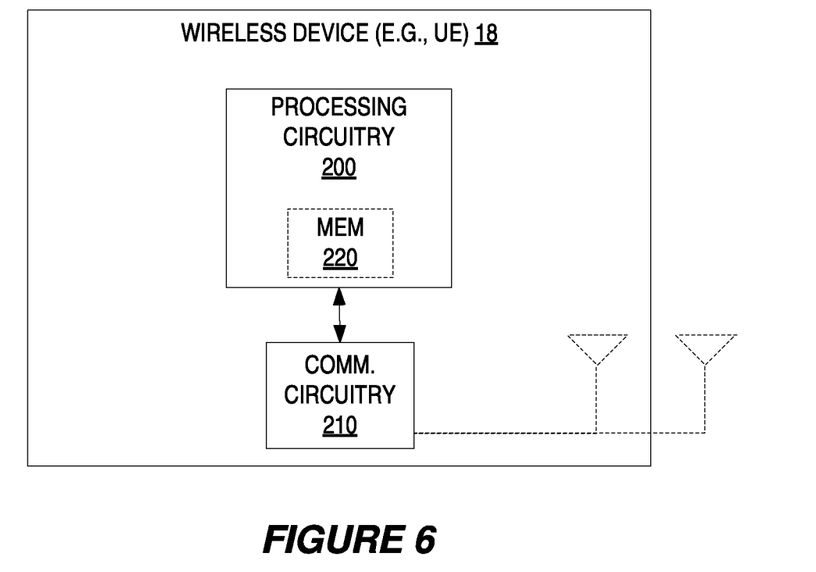
FIG. 6 is a block diagram of a wireless device according to some embodiments.

FIG. 6 illustrates additional details of a wireless device 18 in accordance with one or more embodiments. As shown, the wireless device 18 includes processing circuitry 200 and communication circuitry 210 (e.g., one or more radio circuits). The communication circuitry 210 may be configured to transmit via one or more antennas that are external or internal to the wireless device 18.

Although not shown, the wireless device 18 in some embodiments may further comprise an input interface connected to the processing circuitry 200 and configured to allow input of information into the wireless device 18 to be processed by the processing circuitry 200, and an output interface connected to the processing circuitry 200 and configured to output information from the wireless device 18 that has been processed by the processing circuitry 200. Yet further, the wireless device 18 may comprises a battery connected to the processing circuitry 200 and configured to supply power to the wireless device 18.

In any event, the processing circuitry 200 in FIG. 6 is configured to perform processing described herein, e.g., in FIG. 2 or any of the other embodiments herein, such as by executing instructions stored in memory 220. The processing circuitry 200 in this regard may implement certain functional means or units.

Figure 7:
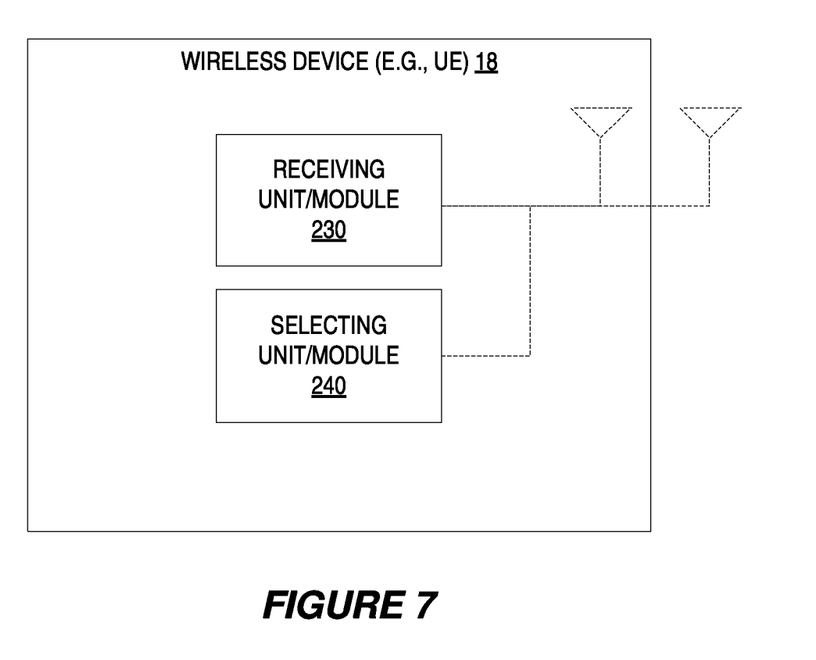
FIG. 7 is a block diagram of a wireless device according to other embodiments.

FIG. 7 in this regard illustrates additional details of a wireless device 18 in accordance with one or more other embodiments. As shown, the wireless device 18 may include a receiving unit or module 230 and a selecting unit or module 240 for respectively performing the receiving and selecting described herein. These units or modules may be implemented by the processing circuitry 200 in FIG. 6.

Alternative embodiments of the wireless device 18 may include additional components beyond those shown in the figures that may be responsible for providing certain aspects of the wireless device's functionality, including any of the functionality described herein and/or any functionality necessary to support the solution described above. As just one example, wireless device 18 may include input interfaces, devices and circuits, and output interfaces, devices and circuits. Input interfaces, devices, and circuits are configured to allow input of information into wireless device 18, and are connected to processing circuitry to allow processing circuitry to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from wireless device 18, and are connected to processing circuitry to allow processing circuitry to output information from wireless device 18. For example, output interfaces, devices, or circuits may include a speaker, a display, vibrating circuitry, a USB port, a headphone interface, or other output elements. Using one or more input and output interfaces, devices, and circuits, wireless device 18 may communicate with end users and/or the wireless network, and allow them to benefit from the functionality described herein.

Those skilled in the art will also appreciate that embodiments herein further include corresponding computer programs.

A computer program comprises instructions which, when executed on at least one processor of a wireless device 18, cause the wireless device 18 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In view of the above, embodiments herein generally include a method performed by a wireless device 18 for selecting a synchronization signal to use as a reference for device-to-device (D2D) communication. The method comprises receiving a multi-level synchronization signal 28 for which prioritization rules at the wireless device 18 define multiple priority levels. The method also comprises selecting, from among multiple received synchronization signals including the multi-level synchronization signal 28, a synchronization signal to use as a reference for D2D communication, based on priority levels defined for the received synchronization signals and based on a radio resource 32 on which the wireless device 18 received the multi-level synchronization signal 28.

In some embodiments, the prioritization rules define one or more priority levels for a synchronization signal based on values of multiple prioritization parameters associated with the synchronization signal, wherein the prioritization parameters include a radio resource on which the synchronization signal is received. In one embodiment, for example, the prioritization rules define different priority levels for synchronization signals that have the same values for the prioritization parameters except a radio resource on which the synchronization signal is received. Alternatively or additionally, in some embodiments the prioritization rules define the multiple priority levels for the multi-level synchronization signal that has certain values for the prioritization parameters, and define a single one of the multiple priority levels for a single-level synchronization signal that has the same certain values for the prioritization parameters except a radio resource on which the synchronization signal is received.

In any of these embodiments, the prioritization rules may define a single priority level for a single-level one of the multiple received synchronization signals different than the multi-level synchronization signal. In one embodiment, for example, the prioritization rules define the single priority level for the single-level synchronization signal based on the single-level synchronization signal being received by the wireless device on a different radio resource than the multi-level synchronization signal. In fact, in some embodiments, the prioritization rules define the multiple priority levels for the multi-level synchronization signal that has certain values for prioritization parameters, and define the single priority level for the single-level synchronization signal that has the same certain values for the prioritization parameters except a radio resource on which the synchronization signal is received. The single priority level may be one of the multiple priority levels defined for the multi-level synchronization signal. Regardless, the method may comprise selecting between the single-level synchronization signal and the multi-level synchronization signal, based on radio resources on which the single-level and multi-level synchronization signals are respectively received. Alternatively or additionally, the method may comprise selecting the multi-level synchronization signal over the single-level synchronization signal based on the multi-level synchronization signal being received on a certain radio resource. In fact, in some embodiments the method may comprise selecting the multi-level synchronization signal over the single-level synchronization signal based on the multi-level synchronization signal being received on a certain radio resource, irrespective of any signal measurements performed on the single-level synchronization signal and the multi-level synchronization signal.

In some embodiments, the method further comprises receiving the multiple received synchronization signals.

In some embodiments, the method further comprising the selected synchronization signal as a reference for D2D communication.

In some embodiments, the method further comprise performing the D2D communication using the reference.

In some embodiments, the prioritization rules define different priority levels for synchronization signals with different origins.

In some embodiments, the different priority levels include: a priority level for a synchronization signal originating from a wireless device directly synchronized to a base station; a priority level for a synchronization signal originating from a wireless device indirectly synchronized to a base station; a priority level for a synchronization signal originating from a global navigation satellite system; a priority level for a synchronization signal originating from a wireless device directly synchronized to a global navigation satellite system; a priority level for a synchronization signal originating from a wireless device indirectly synchronized to a global navigation satellite system; and a priority level for a synchronization signal originating from a wireless device that is neither directly nor indirectly synchronized to a base station and that is neither directly or indirectly synchronized to a global navigation satellite system.

In some embodiments, the multiple priority levels defined for the multi-level synchronization signal include: a priority level for a synchronization signal originating from a wireless device indirectly synchronized to a global navigation satellite system; and a priority level for a synchronization signal originating from a wireless device that is neither directly nor indirectly synchronized to a base station and that is neither directly or indirectly synchronized to a global navigation satellite system.

In some embodiments, the prioritization rules define a single priority level for a single-level one of the multiple received synchronization signals different than the multi-level synchronization signal, wherein the single priority level is a priority level for a synchronization signal originating from a wireless device that is neither directly nor indirectly synchronized to a base station and that is neither directly or indirectly synchronized to a global navigation satellite system.

In some embodiments, the prioritization rules define one or more priority levels for a synchronization signal based on values of multiple prioritization parameters associated with the synchronization signal, wherein the prioritization parameters include: a radio resource on which the synchronization signal is received; a sidelink synchronization signal identity with which the synchronization signal is generated; and one or more fields of a physical sidelink broadcast channel associated with the synchronization signal.

In some embodiments, the D2D communication is vehicle-to-everything (V2X) communication.

In some embodiments, the method comprises determining the priority levels defined for the received synchronization signals, and, after determining the multiple priority levels defined for the multi-level synchronization signal, determining whether to select the multi-level synchronization signal based on the radio resource on which the wireless device received the multi-level synchronization signal.

In some embodiments, the prioritization rules define a single priority level for a single-level one of the multiple received synchronization signals different than the multi-level synchronization signal. In this case, the method may comprise, after determining the multiple priority levels defined for the multi-level synchronization signal and the single priority level defined for the single-level synchronization signal, selecting between the multi-level synchronization signal and the single-level synchronization signal based on radio resources on which the wireless device respectively received the multi-level and single-level synchronization signals.

In some embodiments, the prioritization rules define a single priority level for a single-level one of the multiple received synchronization signals different than the multi-level synchronization signal, wherein at least one of the multiple priority levels defined for the multi-level synchronization signal is deemed higher than the single priority level defined for the single-level synchronization signal.

In some embodiments, the multi-level synchronization signal is received from another wireless device that is out of network coverage and that is using a further wireless device as a synchronization source, wherein the further wireless device is also out of network coverage. In one such embodiment, the multiple priority levels are associated with ambiguity or uncertainty in whether the further wireless device is directly synchronized to a global navigation satellite system.

In some embodiments, the prioritization rules define a single priority level for a single-level one of the multiple received synchronization signals different than the multi-level synchronization signal, wherein the single-level synchronization signal is received from another wireless device that is out of network coverage and that is using a further wireless device as a synchronization source, wherein the further wireless device is also out of network coverage.

In some embodiments, the radio resource is a subframe in which the wireless device received the multi-level synchronization signal.

In some embodiments, the wireless device is a user equipment associated with a vehicle.

Embodiments also include a wireless device for selecting a synchronization signal to use as a reference for device-to-device (D2D) communication. The wireless device is configured to receive a multi-level synchronization signal for which prioritization rules at the wireless device define multiple priority levels. The wireless device is also configured to select, from among multiple received synchronization signals including the multi-level synchronization signal, a synchronization signal to use as a reference for D2D communication, based on priority levels defined for the received synchronization signals and based on a radio resource on which the wireless device received the multi-level synchronization signal.

The wireless device may also be configured to perform the method of any of the above embodiments.

Embodiments further include a wireless device for selecting a synchronization signal to use as a reference for device-to-device (D2D) communication. The wireless device comprises a receiving module for receiving a multi-level synchronization signal for which prioritization rules at the wireless device define multiple priority levels. The wireless device also includes a selecting module for selecting, from among multiple received synchronization signals including the multi-level synchronization signal, a synchronization signal to use as a reference for D2D communication, based on priority levels defined for the received synchronization signals and based on a radio resource on which the wireless device received the multi-level synchronization signal.

The wireless device may comprise one or more modules for performing the method of any of the above embodiments.

Embodiments further include a wireless device for selecting a synchronization signal to use as a reference for device-to-device (D2D) communication. The wireless device comprises wireless communication circuitry and processing circuitry whereby the wireless device is configured to: receive a multi-level synchronization signal for which prioritization rules at the wireless device define multiple priority levels; and select, from among multiple received synchronization signals including the multi-level synchronization signal, a synchronization signal to use as a reference for D2D communication, based on priority levels defined for the received synchronization signals and based on a radio resource on which the wireless device received the multi-level synchronization signal.

The wireless device may comprise wireless communication circuitry and processing circuitry whereby the wireless device is configured to perform the method of any of the above embodiments.

Embodiments further include a computer program comprising instructions which, when executed by at least one processor of a wireless device, causes the wireless device to carry out the method of any of the above embodiments. Embodiments also include a carrier containing such computer program, wherein the carrier is one of an electronic signal, optical signal, radio signal, or computer readable storage medium.

Embodiments also include a method performed by a wireless device for selecting a synchronization signal to use as a reference for device-to-device (D2D) communication. The method comprises receiving a multi-level synchronization signal for which prioritization rules at the wireless device define multiple priority levels. The method also comprises selecting, from among multiple received synchronization signals including the multi-level synchronization signal, a synchronization signal to use as a reference for D2D communication, based on one priority level defined for each of the received synchronization signals, including a highest one of the multiple priority levels defined for the multi-level synchronization signal.

In some embodiments, the method further comprises determining the highest one of the multiple priority levels defined for the multi-level synchronization signal and performing said selecting using the determined highest one of the multiple priority levels.

In some embodiments, the method further comprises resolving ambiguity regarding which of the multiple priority levels to use for the multi-level synchronization signal when selecting from among the multiple received synchronization signals.

In some embodiments, the prioritization rules define one or more priority levels for a synchronization signal based on values of multiple prioritization parameters associated with the synchronization signal, wherein the prioritization parameters include a radio resource on which the synchronization signal is received.

In some embodiments, the prioritization rules define different priority levels for synchronization signals that have the same values for the prioritization parameters except a radio resource on which the synchronization signal is received.

In some embodiments, the prioritization rules define the multiple priority levels for the multi-level synchronization signal that has certain values for the prioritization parameters, and define a single one of the multiple priority levels for a single-level synchronization signal that has the same certain values for the prioritization parameters except a radio resource on which the synchronization signal is received.

In some embodiments, the prioritization rules define a single priority level for a single-level one of the multiple received synchronization signals different than the multi-level synchronization signal. In one embodiment, for example, the prioritization rules define the single priority level for the single-level synchronization signal based on the single-level synchronization signal being received by the wireless device on a different radio resource than the multi-level synchronization signal. For instance, in some embodiments the prioritization rules define the multiple priority levels for the multi-level synchronization signal that has certain values for prioritization parameters, and define the single priority level for the single-level synchronization signal that has the same certain values for the prioritization parameters except a radio resource on which the synchronization signal is received. The single priority level may be one of the multiple priority levels defined for the multi-level synchronization signal. Regardless, in some embodiments said selecting comprises selecting between the single-level synchronization signal and the multi-level synchronization signal, based on the single priority level defined for the single-level synchronization signal and the highest one of the multiple priority levels defined for the multi-level synchronization signal.

Alternatively or additionally, in some embodiments, said selecting comprises selecting the multi-level synchronization signal over the single-level synchronization signal based on the highest one of the multiple priority levels defined for the multi-level synchronization signal being higher than the single priority level defined for the single-level synchronization signal. In one embodiment, for example, said selecting comprises selecting the multi-level synchronization signal over the single-level synchronization signal, irrespective of any signal measurements performed on the single-level synchronization signal and the multi-level synchronization signal.

In some embodiments, the method further comprises receiving the multiple received synchronization signals.

In some embodiments, the method further comprises using the selected synchronization signal as a reference for D2D communication.

In some embodiments, the method further comprises performing the D2D communication using the reference.

In some embodiments, the prioritization rules define different priority levels for synchronization signals with different origins. In one embodiment, for example, the different priority levels include: a priority level for a synchronization signal originating from a wireless device directly synchronized to a base station; a priority level for a synchronization signal originating from a wireless device indirectly synchronized to a base station; a priority level for a synchronization signal originating from a global navigation satellite system; a priority level for a synchronization signal originating from a wireless device directly synchronized to a global navigation satellite system; a priority level for a synchronization signal originating from a wireless device indirectly synchronized to a global navigation satellite system; and a priority level for a synchronization signal originating from a wireless device that is neither directly nor indirectly synchronized to a base station and that is neither directly or indirectly synchronized to a global navigation satellite system.

Alternatively or additionally, in some embodiments, the multiple priority levels defined for the multi-level synchronization signal include: a priority level for a synchronization signal originating from a wireless device indirectly synchronized to a global navigation satellite system; and a priority level for a synchronization signal originating from a wireless device that is neither directly nor indirectly synchronized to a base station and that is neither directly or indirectly synchronized to a global navigation satellite system.

In some embodiments, the prioritization rules define a single priority level for a single-level one of the multiple received synchronization signals different than the multi-level synchronization signal, wherein the single priority level is a priority level for a synchronization signal originating from a wireless device that is neither directly nor indirectly synchronized to a base station and that is neither directly or indirectly synchronized to a global navigation satellite system.

In some embodiments, the prioritization rules define one or more priority levels for a synchronization signal based on values of multiple prioritization parameters associated with the synchronization signal, wherein the prioritization parameters include: a radio resource on which the synchronization signal is received; a sidelink synchronization signal identity with which the synchronization signal is generated; and one or more fields of a physical sidelink broadcast channel associated with the synchronization signal.

In some embodiments, the D2D communication is vehicle-to-everything (V2X) communication.

In some embodiments, said selecting comprises determining the priority levels defined for the received synchronization signals based on the radio resources on which the wireless device received the synchronization signals.

In some embodiments, the prioritization rules define a single priority level for a single-level one of the multiple received synchronization signals different than the multi-level synchronization signal, wherein at least one of the multiple priority levels defined for the multi-level synchronization signal is deemed higher than the single priority level defined for the single-level synchronization signal.

In some embodiments, the multi-level synchronization signal is received from another wireless device that is out of network coverage and that is using a further wireless device as a synchronization source, wherein the further wireless device is also out of network coverage. In one embodiment, for example, the multiple priority levels are associated with ambiguity or uncertainty in whether the further wireless device is directly synchronized to a global navigation satellite system.

In some embodiments, the prioritization rules define a single priority level for a single-level one of the multiple received synchronization signals different than the multi-level synchronization signal, wherein the single-level synchronization signal is received from another wireless device that is out of network coverage and that is using a further wireless device as a synchronization source, wherein the further wireless device is also out of network coverage.

In some embodiments, the radio resource is a subframe in which the wireless device received the multi-level synchronization signal.

In some embodiments, the wireless device is a user equipment associated with a vehicle.

Embodiments also include a wireless device for selecting a synchronization signal to use as a reference for device-to-device (D2D) communication. The wireless device is configured to receive a multi-level synchronization signal for which prioritization rules at the wireless device define multiple priority levels. The wireless device is also configured to select, from among multiple received synchronization signals including the multi-level synchronization signal, a synchronization signal to use as a reference for D2D communication, based on one priority level defined for each of the received synchronization signals, including a highest one of the multiple priority levels defined for the multi-level synchronization signal.

The wireless device may also be configured to perform the method of any of the above embodiments.

Embodiments further include a wireless device for selecting a synchronization signal to use as a reference for device-to-device (D2D) communication. The wireless device comprises a receiving module for receiving a multi-level synchronization signal for which prioritization rules at the wireless device define multiple priority levels. The wireless device further comprises a selecting module for selecting, from among multiple received synchronization signals including the multi-level synchronization signal, a synchronization signal to use as a reference for D2D communication, based on one priority level defined for each of the received synchronization signals, including a highest one of the multiple priority levels defined for the multi-level synchronization signal.

The wireless device may also comprise one or more modules for performing the method of any of the embodiments above.

Embodiments also include a wireless device for selecting a synchronization signal to use as a reference for device-to-device (D2D) communication. The wireless device comprises wireless communication circuitry and processing circuitry whereby the wireless device is configured to: receive a multi-level synchronization signal for which prioritization rules at the wireless device define multiple priority levels; and select, from among multiple received synchronization signals including the multi-level synchronization signal, a synchronization signal to use as a reference for D2D communication, based on one priority level defined for each of the received synchronization signals, including a highest one of the multiple priority levels defined for the multi-level synchronization signal.

The wireless device may comprise wireless communication circuitry and processing circuitry whereby the wireless device is configured to perform the method of any of the embodiments above.

Embodiments further include a computer program comprising instructions which, when executed by at least one processor of a wireless device, causes the wireless device to carry out the method of any of the embodiments above. Embodiments also include a carrier containing the computer program, wherein the carrier is one of an electronic signal, optical signal, radio signal, or computer readable storage medium.

Embodiments also include a method performed by a wireless device for selecting a synchronization signal to use as time and frequency reference for a Device-to-Device, D2D, transmission and/or reception. The method comprises receiving a first synchronization signal, wherein information associated with the first synchronization signal indicates more than one priority levels for the first synchronization signal. The method also comprises receiving a second synchronization signal, wherein information associated with the second synchronization signal indicates a priority level for the second synchronization signal being the same as one of the more than one priority levels for the first synchronization signal. The method may also comprise selecting one of the first and the second synchronization signals as time and frequency reference for a Device-to-Device, D2D, transmission and/or reception based on which radio resource that is used for transmitting the first synchronization signal and the second synchronization signal respectively.

Embodiments also include a method performed by a wireless device for selecting a synchronization signal to use as a reference for device-to-device (D2D) communication. The method comprises receiving synchronization signals that each have the same values for multiple prioritization parameters, except the synchronization signals have different values for a prioritization parameter comprising a radio resource on which a synchronization signal is received. The method further comprises selecting, from among the received synchronization signals, the synchronization signal received on a certain radio resource, and using the selecting synchronization signal as a reference for D2D communication.

In some embodiments, the multiple prioritization parameters for which the synchronization signals have the same values include a synchronization signal identity based on which the signals are generated and one or more fields of a physical sidelink broadcast channel associated with the synchronization signal.

In some embodiments, the certain radio resource is a radio resource with an index of 2.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a wireless device, for selecting a synchronization signal to use as a reference for device-to-device (D2D) communication, the method comprising:
receiving a multi-level synchronization signal for which prioritization rules at the wireless device define multiple priority levels; and
selecting, from among multiple received synchronization signals including the multi-level synchronization signal, a synchronization signal to use as a reference for D2D communication, based on priority levels defined for the received synchronization signals and based on a radio resource on which the wireless device received the multi-level synchronization signal; wherein the selecting comprises:
determining the priority levels defined for the received synchronization signals; and
after determining the multiple priority levels defined for the multi-level synchronization signal, determining whether to select the multi-level synchronization signal based on the radio resource on which the wireless device received the multi-level synchronization signal.

2. The method of claim 1:
wherein the multiple received synchronization signals further include a single-level synchronization signal for which the prioritization rules define a single priority level;
wherein the selecting comprises, after determining the multiple priority levels defined for the multi-level synchronization signal and the single priority level defined for the single-level synchronization signal, selecting between the multi-level synchronization signal and the single-level synchronization signal based on radio resources on which the wireless device respectively received the multi-level and single-level synchronization signals.

3. The method of claim 1:
wherein the multiple received synchronization signals include a single-level synchronization signal for which the prioritization rules define a single priority level; and
wherein the selecting comprises selecting the multi-level synchronization signal over the single-level synchronization signal based on the multi-level synchronization signal being received on a certain radio resource.

4. The method of claim 3, wherein the selecting comprises selecting the multi-level synchronization signal over the single-level synchronization signal based on the multi-level synchronization signal being received on a certain radio resource, irrespective of any signal measurements performed on the single-level synchronization signal and the multi-level synchronization signal.

5. The method of claim 1, further comprising performing the D2D communication using the reference.

6. The method of claim 1, wherein the prioritization rules define different priority levels for synchronization signals with different origins.

7. The method of claim 1:
wherein the multiple priority levels defined for the multi-level synchronization signal include a priority level for a synchronization signal originating from a wireless device indirectly synchronized to a global navigation satellite system and a priority level for a synchronization signal originating from a wireless device that is neither directly nor indirectly synchronized to a base station and that is neither directly or indirectly synchronized to a global navigation satellite system;
wherein the multiple received synchronization signals include a single-level synchronization signal for which the prioritization rules define a single priority level;
wherein the single priority level is a priority level for a synchronization signal originating from a wireless device that is neither directly nor indirectly synchronized to a base station and that is neither directly or indirectly synchronized to a global navigation satellite system.

8. The method of claim 1, wherein the prioritization rules define one or more priority levels for a synchronization signal based on values of multiple prioritization parameters associated with the synchronization signal, wherein the prioritization parameters include:
a radio resource on which the synchronization signal is received;
a sidelink synchronization signal identity with which the synchronization signal is generated; and
one or more fields of a physical sidelink broadcast channel associated with the synchronization signal.

9. The method of claim 1:
wherein the multi-level synchronization signal is received from another wireless device that is out of network coverage and that is using a further wireless device as a synchronization source; and
wherein the further wireless device is also out of network coverage.

10. The method of claim 9, wherein the multiple priority levels are associated with ambiguity or uncertainty in whether the further wireless device is directly synchronized to a global navigation satellite system.

11. The method of claim 9, wherein the prioritization rules define that the multi-level synchronization signal is to have one of the multiple priority levels when the further wireless device is directly synchronized to a global navigation satellite system and is to have a different one of the multiple priority levels when the further wireless device is not directly synchronized to a global navigation satellite system.

12. A method, performed by a wireless device, for selecting a synchronization signal to use as a reference for device-to-device (D2D) communication, the method comprising:

receiving a multi-level synchronization signal for which prioritization rules at the wireless device define multiple priority levels; and selecting, from among multiple received synchronization signals including the multi-level synchronization signal, a synchronization signal to use as a reference for D2D communication, based on priority levels defined for the received synchronization signals and based on a radio resource on which the wireless device received the multi-level synchronization signal;

wherein the prioritization rules define one or more priority levels for a synchronization signal based on values of multiple prioritization parameters associated with the synchronization signal, wherein the prioritization parameters include a radio resource on which the synchronization signal is received.

13. The method of claim 12:

wherein the multiple received synchronization signals include a single-level synchronization signal for which the prioritization rules define a single priority level;

wherein prioritization parameters associated with the multi-level synchronization signal have certain values; and wherein prioritization parameters associated with the single-level synchronization signal have the same certain values, except that the single-level synchronization signal and the multi-level synchronization signal are received on different radio resources.

14. A wireless device for selecting a synchronization signal to use as a reference for device-to-device (D2D) communication, the wireless device comprising:

wireless communication circuitry; and processing circuitry whereby the wireless device is configured to:

receive a multi-level synchronization signal for which prioritization rules at the wireless device define multiple priority levels;

determine the priority levels defined for the received synchronization signals;

select, from among multiple received synchronization signals including the multi-level synchronization signal, a synchronization signal to use as a reference for D2D communication, based on priority levels defined for the received synchronization signals and based on a radio resource on which the wireless device received the multi-level synchronization signal; and after determining the multiple priority levels defined for the multi-level synchronization signal, determine whether to select the multi-level synchronization signal based on the radio resource on which the wireless device received the multi-level synchronization signal.

15. The wireless device of claim 14:

wherein the multiple received synchronization signals include a single-level synchronization signal for which the prioritization rules define a single priority level;

wherein the wireless device is configured to, after determining the multiple priority levels defined for the multi-level synchronization signal and the single priority level defined for the single-level synchronization signal, select between the multi-level synchronization signal and the single-level synchronization signal based on radio resources on which the wireless device respectively received the multi-level and single-level synchronization signals.

16. The wireless device of claim 14, further configured to perform the D2D.

17. A wireless device for selecting a synchronization signal to use as a reference for device-to-device (D2D) communication, the wireless device comprising:

wireless communication circuitry; and processing circuitry whereby the wireless device is configured to:

receive a multi-level synchronization signal for which prioritization rules at the wireless device define multiple priority levels; and select, from among multiple received synchronization signals including the multi-level synchronization signal, a synchronization signal to use as a reference for D2D communication, based on priority levels defined for the received synchronization signals and based on a radio resource on which the wireless device received the multi-level synchronization signal;

wherein the prioritization rules define one or more priority levels for a synchronization signal based on values of multiple prioritization parameters associated with the synchronization signal, wherein the prioritization parameters include a radio resource on which the synchronization signal is received.

18. The wireless device of claim 17:

wherein the multiple received synchronization signals include a single-level synchronization signal for which the prioritization rules define a single priority level;

wherein prioritization parameters associated with the multi-level synchronization signal have certain values; and wherein prioritization parameters associated with the single-level synchronization signal have the same certain values, except that the single-level synchronization signal and the multi-level synchronization signal are received on different radio resources.

* * * * *